(12) United States Patent
Burkhardt et al.

(10) Patent No.: US 8,370,047 B2
(45) Date of Patent: Feb. 5, 2013

(54) METHOD FOR OPERATING A FORCED-INDUCTION INTERNAL COMBUSTION ENGINE

(75) Inventors: Thomas Burkhardt, Neutraubling (DE); Roland Schwarz, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 730 days.

(21) Appl. No.: 12/600,288

(22) PCT Filed: Mar. 20, 2008

(86) PCT No.: PCT/EP2008/053428
§ 371 (c)(1),
(2), (4) Date: Nov. 16, 2009

(87) PCT Pub. No.: WO2008/138669
PCT Pub. Date: Nov. 20, 2008

(65) Prior Publication Data
US 2010/0152992 A1 Jun. 17, 2010

(30) Foreign Application Priority Data
May 15, 2007 (DE) .......................... 10 2007 022 703

(51) Int. Cl.
*G06F 19/00* (2011.01)
*G06G 7/70* (2006.01)
(52) U.S. Cl. ........................................ 701/102; 701/115
(58) Field of Classification Search ................ 60/603, 60/605.1, 600, 610; 73/114.31, 114.32, 114.33, 73/114.37; 701/101, 102, 103, 104, 105, 701/114, 106, 115; 123/403, 564
See application file for complete search history.

(56) References Cited

U.S. PATENT DOCUMENTS

| | | | |
|---|---|---|---|
| 5,889,205 A | 3/1999 | Engl et al. | |
| 5,974,870 A | 11/1999 | Engl et al. | |
| 7,457,700 B2 | 11/2008 | Frauenkron et al. | |
| 2006/0200298 A1* | 9/2006 | Jehle | 701/104 |

(Continued)

FOREIGN PATENT DOCUMENTS

| | | |
|---|---|---|
| DE | 10009181 A1 | 9/2001 |
| DE | 10158261 A1 | 6/2003 |

(Continued)

OTHER PUBLICATIONS

Nitzke H.-G., Rebohl T.: Fullungserlassung fur aufgeiadene Dieselmotoren. VDI- Berichte Nr 1672, AUTOEG 2002; S.311-320.

(Continued)

*Primary Examiner* — Stephen K Cronin
*Assistant Examiner* — Sizo Vilakazi
(74) *Attorney, Agent, or Firm* — King & Spalding L.L.P.

(57) ABSTRACT

The precision of an intake manifold model for a supercharged internal combustion engine can be improved, wherein a first pressure value in the inlet tract (3) downstream of a throttle valve (6) and upstream of a compressor (7) and second pressure value (3) downstream of the compressor (7) are calculated by means of the intake manifold model. Furthermore, a first reference pressure and a second reference pressure are recorded by two pressure sensors (13, 14). It is determined whether the internal combustion engine (1) is operating in charging mode or not. The intake manifold model is then corrected on a difference between the first pressure value and the first reference value and a difference between the second pressure value and the second reference value depending on whether the operating mode is the charging mode or not.

20 Claims, 5 Drawing Sheets

U.S. PATENT DOCUMENTS

2006/0293827 A1* 12/2006 Frauenkron et al. .......... 701/103
2008/0022677 A1* 1/2008 Barbe et al. .................... 60/599
2009/0132148 A1 5/2009 Burkhardt

FOREIGN PATENT DOCUMENTS

| DE | 102004038733 A1 | 2/2006 |
|---|---|---|
| DE | 102005022691 A1 | 11/2006 |
| DE | 102006033460 B3 | 10/2007 |
| DE | 102004036064 A1 | 3/2008 |
| EP | 886725 B1 | 8/1999 |
| EP | 0520559 B1 | 9/1999 |
| EP | 1398470 A1 | 3/2004 |
| EP | 1593829 A1 | 11/2005 |

OTHER PUBLICATIONS

International PCT Search Report, PCT/EP2008/053428, 12 pages, Nov. 12, 2008.
German Office action, German application No. 10 2007 022 703 7-26, 3 pages, Jan. 17, 2008.

* cited by examiner

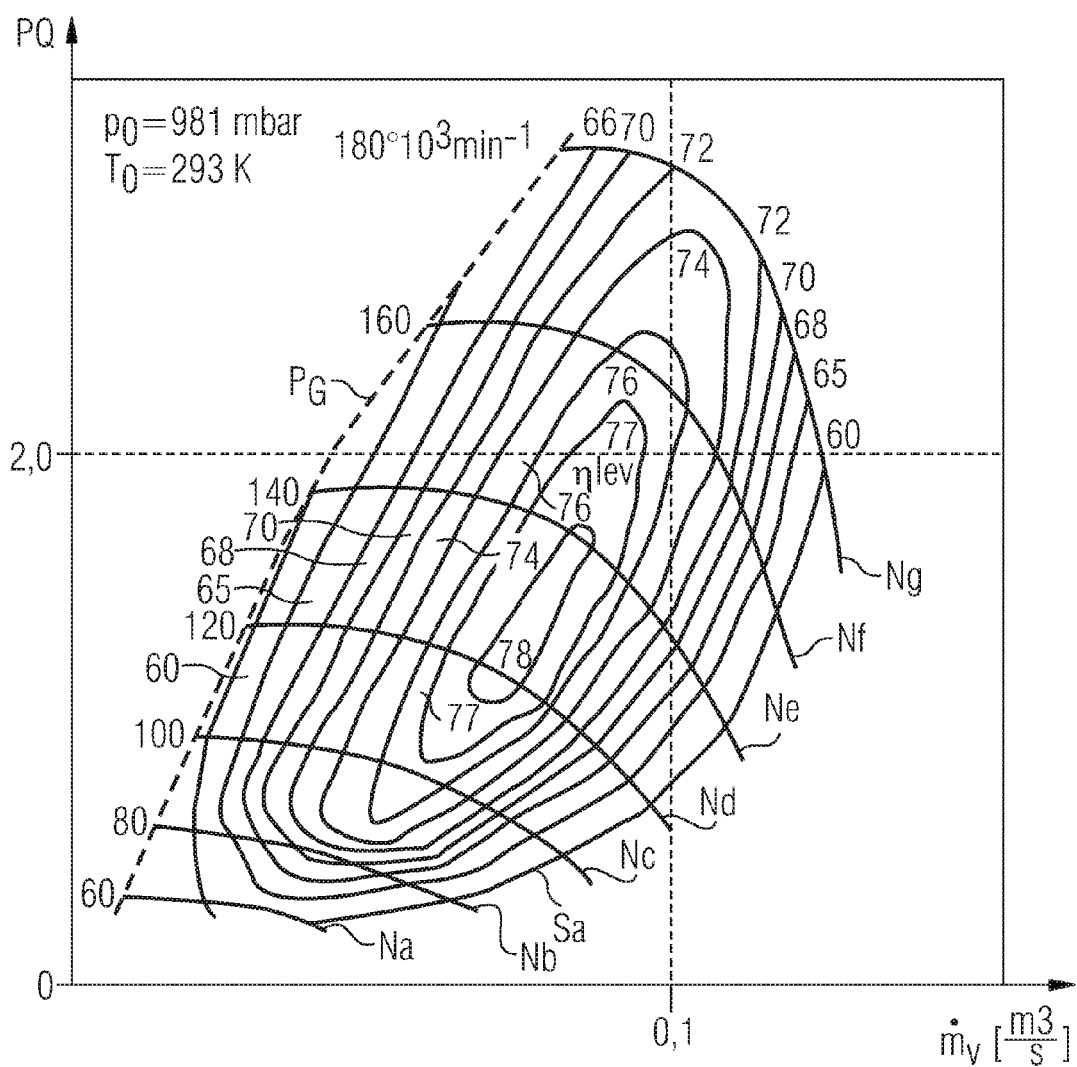

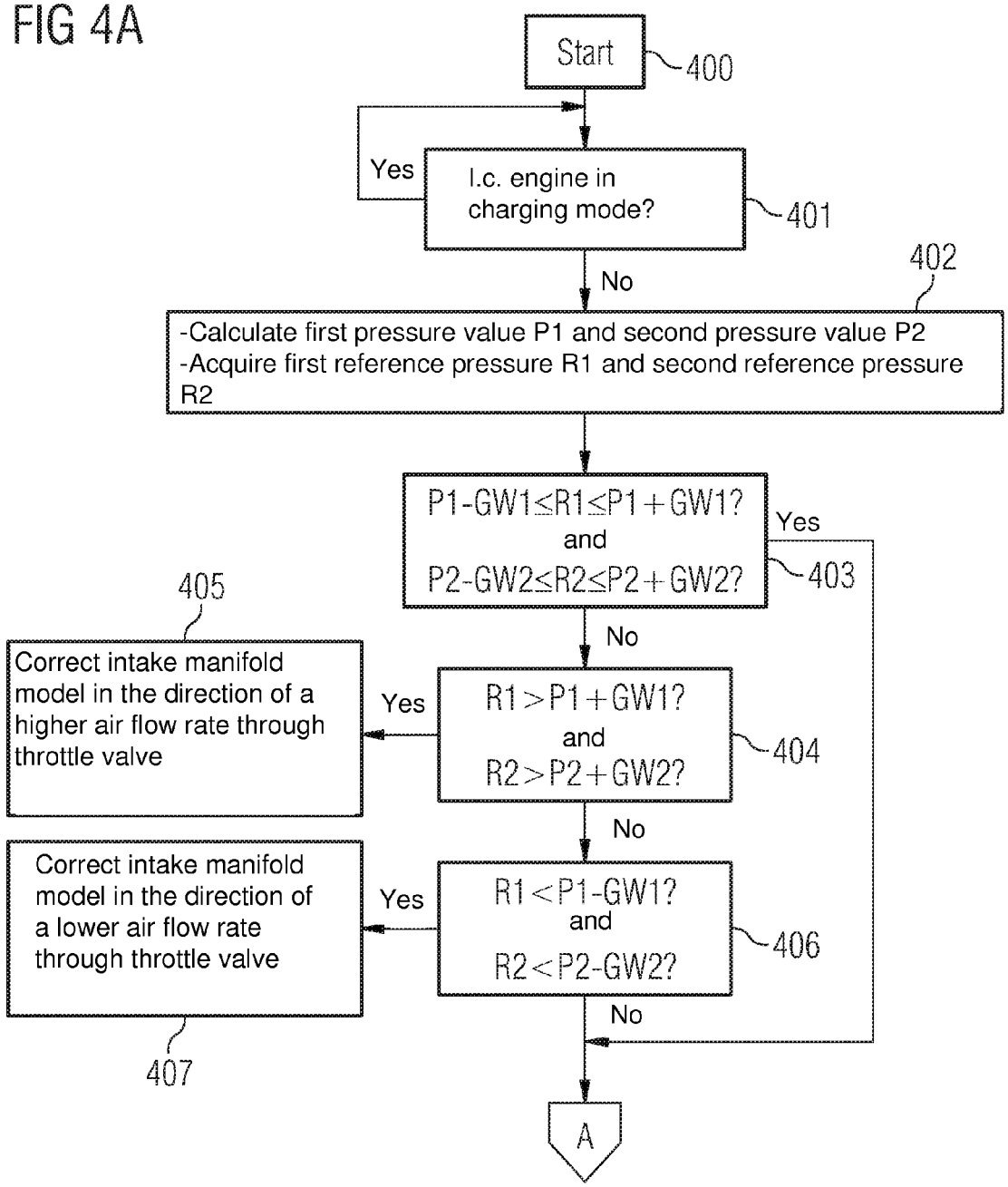

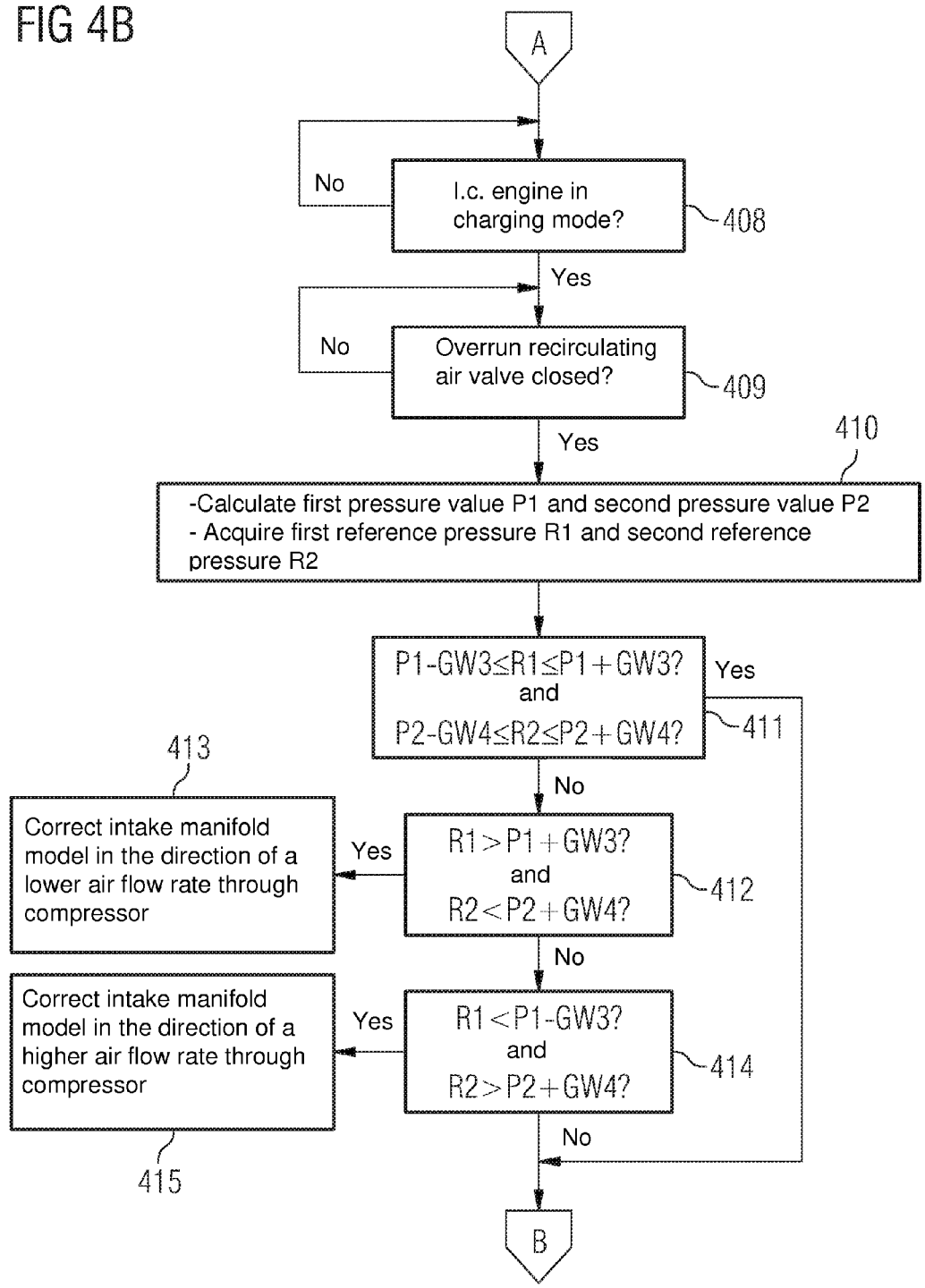

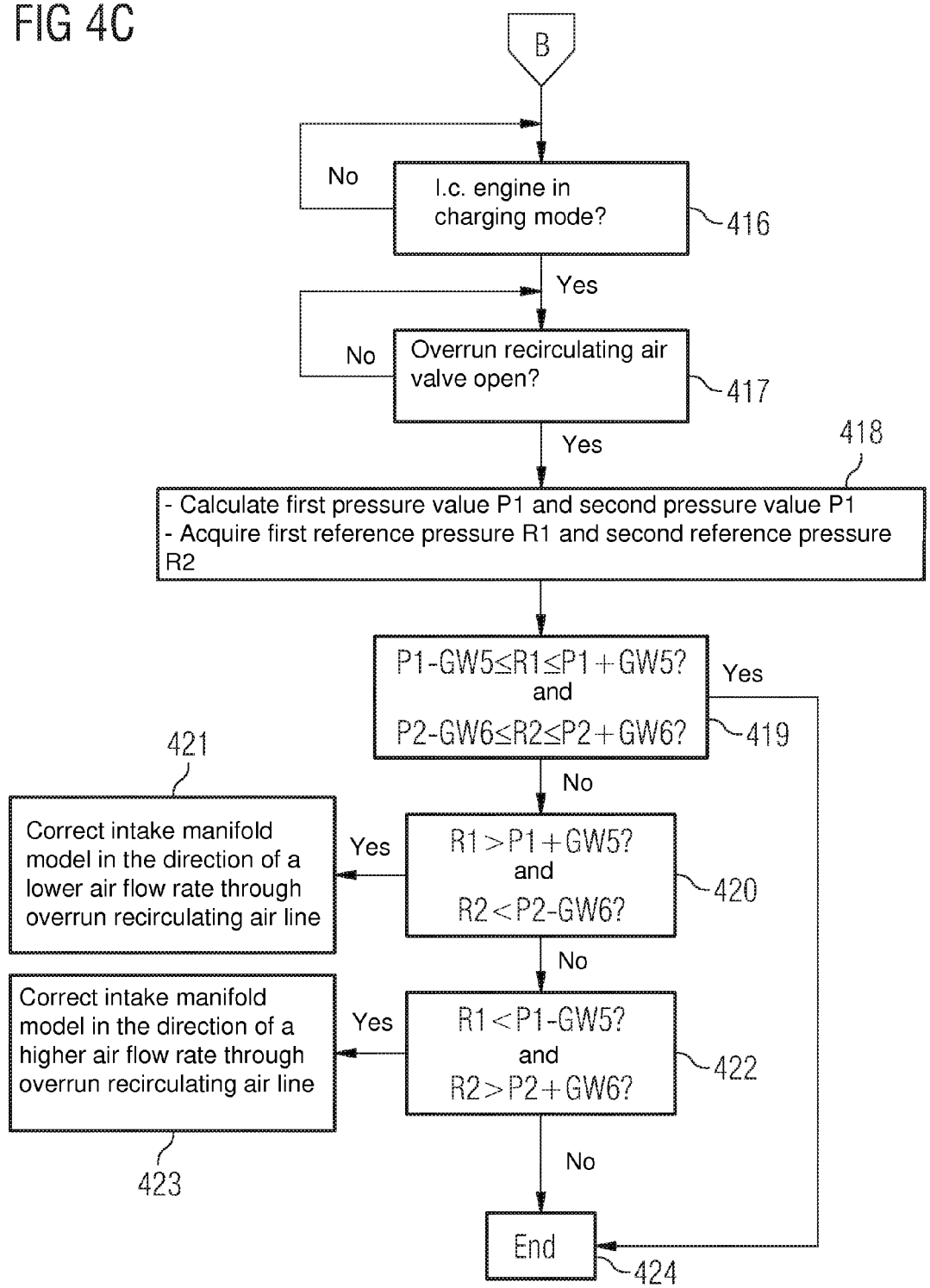

METHOD FOR OPERATING A FORCED-INDUCTION INTERNAL COMBUSTION ENGINE

CROSS-REFERENCE TO RELATED APPLICATIONS

This application is a U.S. National Stage Application of International Application No. PCT/EP2008/053428 filed Mar. 20, 2008, which designates the United States of America, and claims priority to German Application No. 10 2007 022 703.7 filed May 15, 2007, the contents of which are hereby incorporated by reference in their entirety.

TECHNICAL FIELD

The invention relates to a method of controlling a supercharged internal combustion engine as well as to an internal combustion engine having a control device designed in such a way that it may implement the control method.

BACKGROUND

From EP 0 820 559 B1 and EP 0 886 725 B1 an intake manifold model for calculating state variables and/or operating variables inside the intake tract of an internal combustion engine is known. The calculation is effected in this case on the basis of physical regularities and characteristic maps and parameters, which reflect the operating behavior of the components disposed in the intake tract. These characteristic maps and parameters may be supplied either by the manufacturer of the respective component or by means of tests on suitable test stands. The data thus obtained are however mean values for a limited number of tested components. Because of ageing and manufacturing tolerances of the components, deviations of the actual values of the parameters from the stored mean value may individually arise. As this has consequences for the accuracy of the intake manifold model, the resulting inaccuracies have to be compensated by adaptation processes. Known adaptation processes are based mostly on a comparison between an operating parameter calculated by means of the intake manifold model and a corresponding sensor value. If a deviation between the two values is detected, then the parameters of the intake manifold model may be corrected accordingly, thereby improving the accuracy of the intake manifold model.

Compared to naturally aspirated engines, supercharged internal combustion engines have a larger number of components in the intake tract, which have a considerable influence on the state variables of the intake air and a mutual influence on one another in the operating behavior. Whilst a deviation of the variables calculated by the intake manifold model from the corresponding measured variables may be detected, there is no known method that allows an allocation of the cause of the deviation to the individual components and hence a corresponding correction of the intake manifold model.

SUMMARY

According to various embodiments, a control method and an internal combustion engine can be provided, by means of which the accuracy of the intake manifold model for a supercharged internal combustion engine may be improved.

According to an embodiment, a method of controlling an internal combustion engine with an intake tract, a controllable throttle valve for controlling the air flow rate in the intake tract, a compressor, which is disposed in the intake tract downstream of the throttle valve and by means of which the internal combustion engine may be operated selectively in a charging mode and a non-charging mode, a first pressure sensor, which is disposed in the intake tract downstream of the throttle valve and upstream of the compressor, and a second pressure sensor, which is disposed in the intake tract downstream of the compressor, may comprise the steps of:—a first pressure value in the intake tract downstream of the throttle valve and upstream of the compressor and a second pressure value in the intake tract downstream of the compressor are calculated by means of an intake manifold model,—a first reference pressure is acquired by means of the first pressure sensor and a second reference pressure is acquired by means of the second pressure sensor,—it is determined whether the internal combustion engine is in the charging mode or in the non-charging mode, and—the intake manifold model in the event of a deviation of the first pressure value from the first reference pressure and a deviation of the second pressure value from the second reference pressure is corrected as a function of the charging mode or non-charging mode.

According to a further embodiment, in the event that the internal combustion engine is in the non-charging mode, at least one parameter of the intake manifold model, on which the calculation of the air flow rate at the throttle valve is based, can be corrected. According to a further embodiment, in the event that the first reference pressure is greater than the first pressure value, and the second reference pressure is greater than the second pressure value, the at least one parameter can be corrected in the direction of a higher calculated air flow rate at the throttle valve. According to a further embodiment, in the event that the first reference pressure is less than the first pressure value, and the second reference pressure is less than the second pressure value, the at least one parameter can be corrected in the direction of a lower calculated air flow rate at the throttle valve.

According to a further embodiment, in the event that the internal combustion engine is in the charging mode, at least one parameter of the intake manifold model, on which the calculation of the air flow rate through the compressor is based, can be corrected. According to a further embodiment, in the event that the first reference pressure is greater than the first pressure value, and the second reference pressure is less than the second pressure value, the at least one parameter can be corrected in the direction of a lower calculated air flow rate through the compressor. According to a further embodiment, in the event that the first reference pressure is less than the first pressure value, and the second reference pressure is greater than the second pressure value, the at least one parameter can be corrected in the direction of a higher calculated air flow rate through the compressor.

According to a further embodiment, the intake tract may comprise a recirculating air line, which in relation to the compressor pneumatically connects the downstream portion of the intake tract to the upstream portion of the intake tract, disposed in the recirculating air line is a controllable recirculating air valve, by means of which the air flow rate through the recirculating air line is adjustable, wherein the correction of the intake manifold model is implemented additionally as a function of the setting of the recirculating air valve. According to a further embodiment, in the event that the internal combustion engine is in the charging mode and the recirculating air valve is closed, at least one parameter of the intake manifold model, on which the calculation of the air flow rate through the compressor is based, can be corrected. According to a further embodiment, in the event that the first reference pressure is greater than the first pressure value, and the second reference pressure is less than the second pressure value, the at least one parameter can be corrected in the direction of a lower calculated air flow rate through the compressor. According to a further embodiment, in the event that the first reference pressure is less than the first pressure value, and the second reference pressure is greater than the second pressure value, the at least one parameter can be corrected in the direction of a higher calculated air flow rate through the compressor.

According to a further embodiment, in the event that the internal combustion engine is in the charging mode and the recirculating air valve is open, at least one parameter of the intake manifold model, on which the calculation of the air flow rate through the recirculating air line is based, can be corrected. According to a further embodiment, in the event that the first reference pressure is greater than the first pressure value, and the second reference pressure is less than the second pressure value, the at least one parameter can be corrected in the direction of a lower calculated air flow rate through the recirculating air line. According to a further embodiment, in the event that the first reference pressure is less than the first pressure value, and the second reference pressure is greater than the second pressure value, the at least one parameter can be corrected in the direction of a higher calculated air flow rate through the recirculating air line. According to a further embodiment, disposed in the intake tract is a recirculating air line, which in relation to the compressor pneumatically connects the downstream portion of the intake tract to the upstream portion of the intake tract, disposed in the recirculating air line is a controllable recirculating air valve, by means of which the air flow rate through the recirculating air line is adjustable, and according to the method the internal combustion engine is operated in the non-charging mode, in the event of a deviation of the first pressure value from the first reference pressure and a deviation of the second pressure value from the second reference pressure, at least one parameter of the intake manifold model, on which the calculation of the air flow rate at the throttle valve is based, is corrected, the internal combustion engine is operated in the charging mode with the recirculating air valve closed, the first pressure value and the second pressure value are calculated and the first reference pressure and the second reference pressure are acquired, in the event of a deviation of the first pressure value from the first reference pressure and a deviation of the second pressure value from the second reference pressure, at least one parameter of the intake manifold model, on which the calculation of the air flow rate through the compressor is based, is corrected, the internal combustion engine is operated in the charging mode with the recirculating air valve open, the first pressure value and the second pressure value are calculated and the first reference pressure and the second reference pressure are acquired, in the event of a deviation of the first pressure value from the first reference pressure and a deviation of the second pressure value from the second reference pressure, at least one parameter of the intake manifold model, on which the calculation of the air flow rate through the recirculating air valve is based, is corrected.

According to another embodiment, an internal combustion engine may comprise an intake tract, a controllable throttle valve for controlling the air flow rate in the intake tract, a compressor, which is disposed in the intake tract downstream of the throttle valve and by means of which the internal combustion engine may be operated selectively in a charging mode and a non-charging mode, a first pressure sensor, which is disposed in the intake tract downstream of the throttle valve and upstream of the compressor, a second pressure sensor, which is disposed in the intake tract downstream of the compressor, and a control device, in which an intake manifold model for calculating operating variables of the internal combustion engine is implemented, wherein the control device is designed in such a way that a first pressure value in the intake tract downstream of the throttle valve and upstream of the compressor and a second pressure value in the intake tract downstream of the compressor are calculated by means of an intake manifold model, a first reference pressure is acquired by means of the first pressure sensor and a second reference pressure is acquired by means of the second pressure sensor, it is determined whether the internal combustion engine is in the charging mode or in the non-charging mode, the intake manifold model, in the event of a deviation of the first pressure value from the first reference pressure and a deviation of the second pressure value from the second reference pressure, is corrected as a function of the charging mode or non-charging mode.

BRIEF DESCRIPTION OF THE DRAWINGS

There now follows a detailed description of an embodiment of the invention with reference to the accompanying figures. The figures show:

FIG. 3 the characteristic map of a compressor;

FIG. 4A-4C an embodiment of a method in the form of a flowchart.

DETAILED DESCRIPTION

Figure 1:
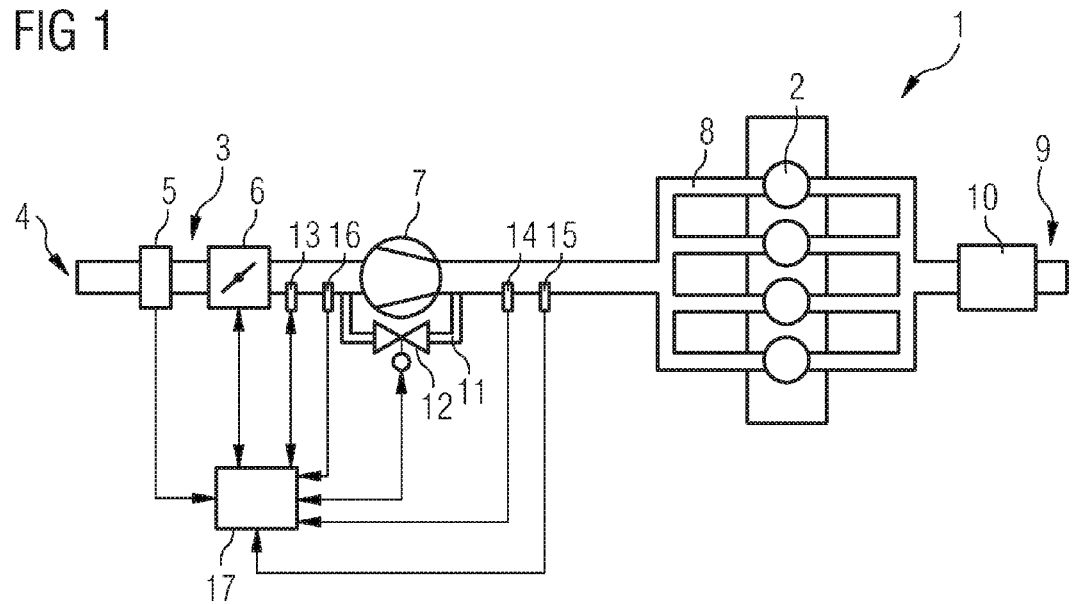
FIG. 1 a diagrammatic representation of an internal combustion engine.

A control method according to an embodiment refers to an internal combustion engine comprising an intake tract, a controllable throttle valve for controlling the air flow rate in the intake tract, a compressor, which is disposed in the intake tract downstream of the throttle valve and by means of which the internal combustion engine may be operated selectively in a charging mode or a non-charging mode. The internal combustion engine further comprises a first pressure sensor, which is disposed in the intake tract downstream of the throttle valve and upstream of the compressor, as well as a second pressure sensor, which is disposed in the intake tract downstream of the compressor. According to the method, a first pressure value in the intake tract downstream of the throttle valve and upstream of the compressor and a second pressure value in the intake tract downstream of the compressor are calculated by means of an intake manifold model. Furthermore, a first reference pressure is acquired by means of the first pressure sensor and a second reference pressure is acquired by means of the second pressure sensor. It is determined whether the internal combustion engine is in charging mode or non-charging mode. In the event of a deviation of the first pressure value from the first reference pressure and a deviation of the second pressure value from the second reference pressure, the intake manifold model is corrected as a function of the charging mode or non-charging mode.

From a deviation of the first pressure value from the first reference pressure and a deviation of the second pressure value from the second reference pressure it is possible to infer a distortion of the intake manifold model, for example because of manufacturing tolerances or an ageing-related variation of a component in the intake tract. Since, in the case of supercharged internal combustion engines, in addition to the throttle valve there is however also the compressor disposed in the intake tract, a clear allocation of the cause of the error and hence a correction of the intake manifold model is no longer easily possible. According to various embodiments, therefore, the intake manifold model is corrected as a function of the charging mode or non-charging mode. This distinction during the correction then allows an allocation of the cause of the error to the individual components and hence a precise adaptation of the intake manifold model. It is therefore possible in the intake manifold model to achieve an appropriate correction of the parameters of the respective component, the deviation of which from the standard parameter actually causes the distortion of the intake manifold model. Thus, the accuracy of the intake manifold model may be increased and control of the internal combustion engine may be improved.

According to a further embodiment, in the event that the internal combustion is in non-charging mode, at least one parameter of the intake manifold model, on which the correction of the air flow rate at the throttle valve is based, is corrected.

If the internal combustion engine is in non-charging mode, which is equivalent to an aspirating mode of the internal combustion engine, at the compressor at most a slight compression of the intake air occurs. In the non-charging mode it is therefore possible to infer from the deviation of the pressure values from the corresponding reference values a discrepancy of the parameters of the intake manifold model, on which the calculation of the air flow rate at the throttle valve is based. In this way, the cause of the error in the non-charging mode may be allocated to the parameters for calculating the air flow rate at the throttle valve.

According to a further embodiment, in the event that the first reference pressure is greater than the first pressure value and the second reference pressure is greater than the second pressure value, the at least one parameter is corrected in the direction of a higher calculated air flow rate at the throttle valve.

The rationale for such a correction is that, in the event that the measured reference pressures are greater than the pressure values calculated by means of the intake manifold model, the air flow rate through the throttle valve that is modeled by means of the intake manifold model is too low. By virtue of a corresponding correction of the parameters of the intake manifold model, on which the calculation of the air flow rate through the throttle valve is based, in the direction of an increase of the air flow rate, the intake manifold model is adapted to the actual conditions.

According to a further embodiment, in the event that the first reference pressure is less than the first pressure value and the second reference pressure is less than the second pressure value, the at least one parameter is corrected in the direction of a lower calculated air flow rate at the throttle valve.

The rationale for such a correction is that, in the event that the measured reference pressures are less than the pressure values calculated by means of the intake manifold model, the air flow rate through the throttle valve that is modeled by means of the intake manifold model is too high. By virtue of a corresponding correction of the parameters of the intake manifold model, on which the calculation of the air flow rate through the throttle valve is based, in the direction of a reduction of the air flow rate, the intake manifold model is adapted to the actual conditions.

According to a further embodiment, in the event that the internal combustion engine is in charging mode, at least one parameter of the intake manifold model, on which the calculation of the air flow rate through the compressor is based, is corrected.

In charging mode a significant compression of the intake air by the compressor occurs. A deviation of the pressure values calculated by means of the intake manifold model from their respective measured reference pressures is therefore to be attributed to a discrepancy of the parameters of the intake manifold model, on which the calculation of the air flow rate through the compressor is based. In this way, the cause of the error in the charging mode may be allocated to the parameters for calculating the air flow rate through the compressor.

According to a further embodiment, in the event that the first reference pressure is greater than the first pressure value and the second reference pressure is less than the second pressure value, the at least one parameter is corrected in the direction of a lower calculated air flow rate through the compressor.

According to a further embodiment, in the event that the first reference pressure is less than the first pressure value and the second reference pressure is greater than the second pressure value, the at least one parameter is corrected in the direction of a higher calculated air flow rate through the compressor.

From deviations of the pressure values from the corresponding reference pressures according to the above embodiments it is possible to infer that the air flow rate through the compressor that is modeled by means of the intake manifold model is too high or too low. By virtue of a corresponding correction of the parameters of the intake manifold model, on which the calculation of the air flow rate through the compressor is based, the intake manifold model is adapted to the actual conditions.

According to another embodiment of an internal combustion engine, the intake tract additionally comprises a recirculating air line, which in relation to the compressor pneumatically connects the downstream portion of the intake tract to the upstream portion of the intake tract. Disposed in the recirculating air line is a controllable recirculating air valve and/or recirculating air flap, by means of which the air flow rate through the recirculating air line is adjustable. According to an embodiment of the method the correction of the intake manifold model is additionally implemented as a function of the setting of the recirculating air valve.

As the setting of the recirculating air valve has a noticeable influence upon the pressure ratios upstream and downstream of the compressor, taking the setting of the recirculating air valve into account when correcting the intake manifold model signifies a marked gain in accuracy.

According to a further embodiment, in the event that the internal combustion engine is in charging mode and the recirculating air valve is closed, at least one parameter of the intake manifold model, on which the calculation of the air flow rate through the compressor is based, is corrected.

According to a further embodiment, in the event that the first reference pressure is greater than the first pressure value and the second reference pressure is less than the second pressure value, the at least one parameter is corrected in the direction of a lower calculated air flow rate through the compressor.

According to a further embodiment, in the event that the first reference pressure is less than the first pressure value and the second reference pressure is greater than the second pressure value, the at least one parameter is corrected in the direction of a higher calculated air flow rate through the compressor.

In the event that the recirculating air valve is closed and the air flow rate through the recirculating air line is negligible, the procedure as described above can be followed. With regard to the advantages, reference is therefore made to the statements regarding these methods.

According to a further embodiment, in the event that the internal combustion engine is in charging mode and the recirculating air valve is at least partially open, at least one parameter of the intake manifold model, on which the calculation of the air flow rate through the recirculating air line is based, is corrected.

In the case of the charging mode of the internal combustion engine with the recirculating air valve open, a considerable influencing of the pressure ratios in the intake tract occurs as a result of the air stream through the recirculating air line. A deviation of the calculated pressure values from the corresponding reference pressures is therefore an indication of a distortion of the parameters for calculating the air flow rate through the recirculating air valve. A corresponding adaptation of these parameters increases the accuracy of the intake manifold model.

According to a further embodiment, in the event that the first reference pressure is greater than the first pressure value and the second reference pressure is less than the second pressure value, the at least one parameter is corrected in the direction of a lower calculated air flow rate through the recirculating air line.

According to a further embodiment, in the event that the first reference pressure is less than the first pressure value and the second reference pressure is greater than the second pressure value, the at least one parameter is corrected in the direction of a higher calculated air flow rate through the recirculating air line.

Given the pressure ratios described above, the air flow rate through the recirculating air valve that is calculated by means of the intake manifold model is either too high or too low. A corresponding adaptation of the parameters for calculating the air flow rate through the recirculating air valve leads to a greater accuracy of the intake manifold model.

According to another embodiment of an internal combustion engine, there is disposed in the intake tract a recirculating air line, which in relation to the compressor pneumatically connects the downstream portion of the intake tract to the upstream portion of the intake tract. Disposed in the recirculating air line is a controllable recirculating air valve (also referred to as a recirculating air flap), by means of which the air flow rate through the recirculating air line is adjustable. According to this development of the method, the internal combustion engine is operated firstly in non-charging mode and, in the event of a deviation of the first pressure value from the first reference pressure and a deviation of the second pressure value from the second reference pressure, at least one parameter of the intake manifold model, on which the calculation of the air flow rate at the throttle valve is based, is corrected. The internal combustion engine is then operated in charging mode with the recirculating air valve closed, the first pressure value and the second pressure value are re-calculated and the first reference pressure and the second reference pressure are re-acquired. In the event of a deviation of the first pressure value from the first reference pressure and a deviation of the second pressure value from the second reference pressure, at least one parameter of the intake manifold model, on which the calculation of the air flow rate through the compressor is based, is corrected. The internal combustion engine is then operated in charging mode with the recirculating air flap open, the first pressure value and the second pressure value are re-calculated and the first reference pressure and the second reference pressure are re-acquired. In the event of a deviation of the first pressure value from the first reference pressure and a deviation of the second pressure value from the second reference pressure, at least one parameter of the intake manifold model, on which the calculation of the air flow rate through the recirculating air valve is based, is corrected.

By virtue of this procedure for the correction of the intake manifold model, a mutual influencing of the individual components is avoided. Thus, if a distortion of the intake manifold model is detected, an allocation of the cause of error to the components is possible.

An internal combustion engine according to an embodiment comprises an intake tract, a throttle valve for controlling the air flow rate in the intake tract, and a compressor, which is disposed in the intake tract downstream of the throttle valve and by means of which the internal combustion engine may be operated selectively in a charging mode or a non-charging mode. The internal combustion engine further comprises a first pressure sensor, which is disposed in an intake tract downstream of the throttle valve and upstream of the compressor, as well as a second pressure sensor, which is disposed in the intake tract downstream of the compressor. Associated with the internal combustion engine is a control device, in which an intake manifold model for calculating operating variables inside the intake tract is implemented and which is designed in such a way that a first pressure value in the intake tract downstream of the throttle valve and upstream of the compressor and a second pressure value in the intake tract downstream of the compressor are calculated. Furthermore, a first reference pressure is acquired by means of the first pressure sensor and a second reference pressure is acquired by means of the second pressure sensor. Once it has been determined whether the internal combustion engine is in charging mode or non-charging mode, in the event of a deviation of the first pressure value from the first reference pressure and a deviation of the second pressure value from the second reference pressure the intake manifold [model] is corrected as a function of the charging mode or non-charging mode.

The internal combustion engine according to an embodiment comprises a control device, which is designed in such a way that it may implement the method described above. Here, the advantages described in the statements regarding the method apply analogously.

In FIG. 1 an embodiment of a supercharged internal combustion 1 is diagrammatically represented. The internal combustion engine 1 has four combustion chambers 2, to which combustion air is supplied via an intake tract 3. Disposed in the intake tract 3 downstream of an intake opening 4 are an air-mass sensor 5, a controllable throttle valve 6 for controlling the air-mass flow in the intake tract 3, and a compressor 7. The compressor 7 may be a mechanical compressor, as in the embodiment, or alternatively an electric compressor or the compressor of an exhaust-gas turbocharger. The intake air is supplied to the individual combustion chambers 2 through a diagrammatically represented intake manifold 8. The combustion exhaust gases are removed from the combustion chambers 2 through an exhaust-gas tract 9. Inside the exhaust-gas tract 9 a catalytic exhaust converter 10 may be situated.

By means of the compressor 7 the internal combustion engine 1 may be operated in a charging mode or a non-charging mode. By the non-charging mode is meant an operating state, in which the pressure ratio PQ at the compressor 7 is less than or only insignificantly greater than 1:

$$PQ = \frac{P2}{P1} \leq 1$$

Here, P2 is the pressure value downstream of the compressor 7 and P1 is the pressure value upstream of the compressor 7.

On the other hand, by the charging mode of the internal combustion engine 1 is meant the operating state, in which the pressure ratio PQ at the compressor 7 is markedly greater than 1:

$$PQ = \frac{P2}{P1} > 1$$

Depending on the design of the compressor 7, the pressure ratio PQ and hence the charging mode or the non-charging mode may be adjusted in various ways. In the case of a mechanical compressor, as represented here in the embodiment, the—in relation to the compressor 7—downstream side of the intake tract 3 is pneumatically connected to the upstream side of the intake tract 3 by a recirculating air line 11. Situated in the recirculating air line 11 is a controllable recirculating air valve 12, by means of which the air flow rate through the recirculating air line 11 is adjustable. Depending on the degree of opening of the recirculating air valve 12, the pressure ratio PQ over the compressor 7 may be adjusted and hence the supercharging state of the internal combustion engine 1 may be influenced.

In the case of an electrically driven compressor 7, this would occur by means of corresponding control of the electric drive.

In the case of an exhaust-gas turbocharger, the pressure ratio PQ at the compressor 7 may be varied using a controllable bypass at the turbine in the wastegate.

In the embodiment of FIG. 1, a first pressure sensor 13 is disposed downstream of the throttle valve 6 and upstream of the compressor 7 and a second pressure sensor 14 is disposed downstream of the compressor 7 in the intake tract 3. A temperature sensor 15 is moreover disposed downstream of the compressor 7 and a further temperature sensor 16 is disposed upstream of the compressor 7 in the intake tract 3.

Associated with the internal combustion engine 1 is a control device 17, in which characteristic-map-based control functions in the form of software are implemented. The control device 17 is connected to all of the actuators and sensors of the internal combustion engine 1 by signal- and data lines. In particular, the control device 17 is connected to the air-mass sensor 5, the controllable throttle valve 6, the recirculating air valve 12, the pressure sensors 13, 14 and the temperature sensors 15, 16.

In the control device 17 an intake manifold model is further implemented, by means of which state variables and operating variables of the internal combustion engine 1 in the intake tract 3 may be calculated. For this purpose, the intake manifold model makes use of physical regularities and in this case uses stored data and parameters that are characteristic of the components, such as throttle valve 6, compressor 7 and recirculating air valve 12. These components influence in particular the pressure ratios in the intake tract.

For example, the intake manifold model calculates the air flow rate $\dot{m}_{DK}$ through the throttle valve 6 using the equation (1):

$$\dot{m}_{DK}^* = A_{RDK} \sqrt{\frac{2\kappa}{\kappa-1} \times \frac{1}{R_L \times T_S}} \times P0 \times \psi\left(\frac{P1}{P0}\right) \qquad (1)$$

Figure 2:
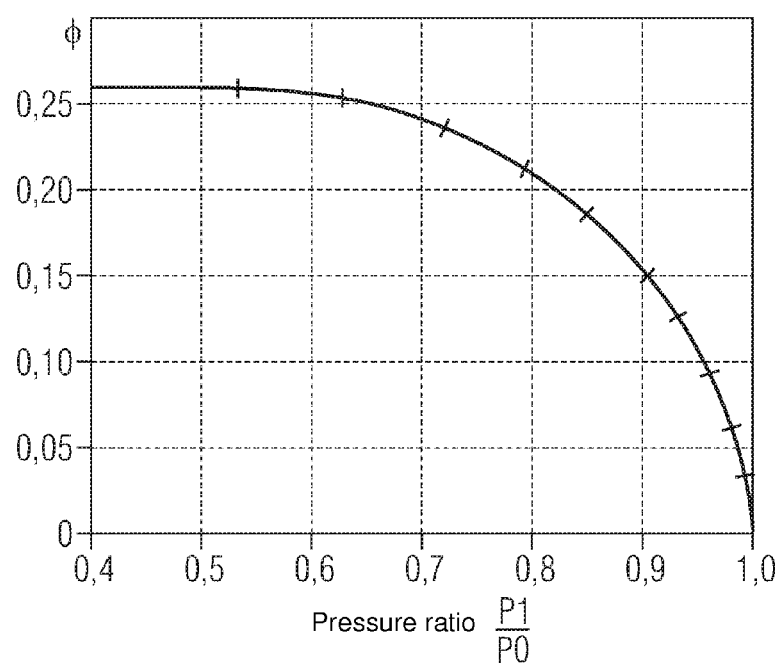
FIG. 2 a graph for determining the flow function $\Psi$.

This equation is also described as a flow equation through throttle points. In the stationary operating state the air flow rate $\dot{m}_{DK}^*$ at the throttle valve 6 is equal to the value acquired by the air-mass sensor 5. The so-called reduced flow cross section $A_{RDK}$ at the throttle valve 6 is stored in the control device 17 in the form of a characteristic map as a function of the angle of opening and is available to the intake manifold model for the calculation. $R_L$ is the ideal gas constant and κ is the isentropic coefficient of the intake air. The air temperature in the intake tract is available as a measured value of the temperature sensor 16 or as a model value in the intake manifold model. The flow function Ψ is represented by way of example in FIG. 2 as a function of the pressure ratio P1/P0 at the throttle valve 6 and is stored in the form of a characteristic map in the control device 17. In this case, P0 is the pressure upstream of the throttle valve 6 and P1 the pressure downstream of the throttle valve 6. The reduced flow cross section $A_{RDK}$ and the flow function Ψ are therefore throttle-valve-specific parameters, on which the calculation of the air flow rate through the throttle valve is based. For more information about the intake manifold model, reference is made to EP 0 820 559 B1 and EP 0 886 725 B1.

Analogously thereto, the flow rate $\dot{m}_{SV}$ through the recirculating air valve 12 may be calculated on the basis of equation (2):

$$\dot{m}_{SV}^* = A_{RSV} \sqrt{\frac{2\kappa}{\kappa-1} \times \frac{1}{R_L \times T_S}} \times P2 \times \psi\left(\frac{P1}{P2}\right) \qquad (2)$$

Here too, the reduced flow cross section $A_{RSV}$ of the recirculating air valve 12 and the flow function Ψ are stored in the form of characteristic maps. $A_{RSV}$ and Ψ are therefore parameters, which are specific to the recirculating air valve 12 and on which the calculation of the air flow rate $\dot{m}_{SV}$ through the recirculating air valve 12 is based.

The default values of the characteristic maps for the reduced flow cross section $A_{RDK}$ at the throttle valve 6, for the reduced flow cross section $A_{RSV}$ of the recirculating air valve 12 and for the flow function Ψ may be configured with variable weighting factors.

The air flow rate $\dot{m}$ through the compressor 7 may be calculated on the basis of a compressor characteristic map. A compressor characteristic map is represented by way of example in FIG. 3 and may be obtained from the manufacturer of the compressor 7. The compressor characteristic map indicates the relationship between the air flow rate $\dot{m}$ (or volumetric flow $\dot{V}$) through the compressor 7 and the pressure ratio PQ at the compressor 7. In the compressor characteristic map of FIG. 3 lines of constant rotational speeds Na to Ng are further included. Areas of identical efficiency η of the compressor 7 are represented in the form of contour lines. In the case of a turbocharger, the operating area of the compressor 7 is limited by the maximum rotational speed Ng, the surge limit PG and the stuffing limit Sa. The default value of the compressor characteristic map for the air flow rate $\dot{m}_V$ may be manipulated for example by a further variable weighting factor. This weighting factor is therefore a parameter, on the basis of which the air flow rate through the compressor 7 is calculated.

In FIG. 4 an embodiment of a control method for the internal combustion engine 1 is represented in the form of a flowchart. The method begins in step 400 for example after starting the internal combustion engine 1. First, in step 401 it is checked whether the internal combustion engine 1 is in the charging mode. This query is repeated until it is established that the internal combustion engine 1 is in the non-charging mode.

Then, in step 402 a first pressure value P1 downstream of the throttle valve 6 and upstream of the compressor 7 and a second pressure value P2 downstream of the compressor 7 are calculated by means of the intake manifold model.

Furthermore, a first reference pressure R1 is acquired by means of the first pressure sensor 13 and a second reference pressure R2 is acquired by means of the second pressure sensor 14.

In step 403 it is checked whether the first pressure value P1 deviates by more than a defined first limit value GW1 from the first reference pressure R1 and whether at the same time the second pressure value P2 deviates by a defined second limit value GW2 from the second reference pressure. If the first pressure value P1 and the second pressure value P2 are outside of the tolerance bands defined by the limit values GW1 and GW2, then in step 404 it is checked whether the first reference pressure R1 is greater than the sum of the first pressure value P1 and the first limit value GW1 and whether at the same time the second reference pressure R2 is greater than the sum of the second pressure value P2 by [sic] the second limit value GW2. As the internal combustion engine 1 is in the non-charging mode, no significant compression of the intake air by the compressor occurs. If therefore the condition in step 404 is met, it may be inferred that the air flow rate through the throttle valve 6 that is calculated by means of the intake manifold model is too low. For this reason, in step 405 the intake manifold model is corrected in the direction of a higher air flow rate through the throttle valve 6. With reference to equation 1, this may be realized for example by appropriate weighting of the characteristic maps for the effective opening cross section $A_{RDK}$ of the throttle valve 6 or for the flow function $\Psi$.

If however the response to the query in step 404 is negative, then in step 406 it is checked whether the first reference pressure R1 is less than the difference between the first pressure value P1 and the first limit value GW1 and whether the second reference pressure R2 is less the difference between the second pressure value P2 and the second limit value GW2. If this is the case, it is to be inferred that the air flow rate through the throttle valve 6 that is calculated by means of the intake manifold model is too high. For this reason, given a positive response to the query in step 406, the intake manifold model in step 407 is corrected in the direction of a lower compressed-air set [sic] of the throttle valve 6. This may be effected in an analogous manner to step 405 for example by a corresponding reduction of the effective opening cross section $A_{RDK}$ through the throttle valve 6 or of the flow function $\Psi$.

From a positive response to the query in step 403 or a negative response to the query in step 406 it may be inferred that the calculation of the air flow rate through the throttle valve 6 by means of the intake manifold model is based on correct data. In both cases, the method continues with step 408.

In step 408 it is checked once more whether the internal combustion engine is in the charging mode or in the non-charging mode. The query is repeated until the internal combustion engine 1 is in the charging mode.

In the event that the internal combustion engine 1 comprises a recirculating air line 11 with a recirculating air valve 12, in step 409 it is checked whether the recirculating air valve 12 is closed. This query is repeated until it is established that the recirculating air valve 12 is closed. In the case of an internal combustion engine 1 without a recirculating air line 11 and without a recirculating valve 12, such as for example in an internal combustion engine 1 with an exhaust-gas turbocharger, the method continues directly with step 410.

In step 410 the first pressure value P1 and the second pressure value P2 are re-calculated. Furthermore, the first reference pressure R1 and the second reference pressure R2 are re-acquired.

In step 411 it is checked whether the first pressure value P1 deviates by more than a defined third limit value GW3 from the first reference pressure R1 and whether at the same time the second pressure value P2 deviates by more than a defined fourth limit value GW4 from the second reference pressure R2.

If this is not the case, in step 412 it is checked whether the first reference pressure R1 is greater than the sum of the first pressure value P1 and the third limit value GW3 and whether at the same time the second reference pressure R2 is less than the difference between the second pressure value P2 and the fourth limit value GW4. If this is the case, it is to be inferred that the air flow rate through the compressor 7 that is calculated by means of the intake manifold model is too high. For this reason, in step 413 the intake manifold model is corrected in the direction of a lower air flow rate through the compressor 7. This may be realized for example by a corresponding weighting of the compressor characteristic map (see FIG. 3) stored in the control device 17.

If however the condition in step 412 is not met, in step 414 it is checked whether the first reference pressure R1 is less than the difference between the first pressure value P1 and the third limit value GW3 and whether at the same time the second reference pressure R2 is greater than the sum of the second pressure value P2 and the fourth limit value GW4.

If this is the case, it is to be inferred that the air flow rate through the compressor 7 that is calculated by means of the intake manifold model is too low. For this reason, in step 415 the intake manifold model is corrected in the direction of a higher air flow rate at the compressor 7. This may occur in an analogous manner to step 413 for example by corresponding weighting of the stored compressor characteristic map.

If the condition in step 411 is met or the condition in step 414 is not met, it may be inferred that the calculation of the air flow rate through the compressor 7 by means of the intake manifold model is based on correct data, especially as the data for calculating the air flow rate through the throttle valve 6 have also been previously already validated and an influencing by the recirculating air valve 12 may be ruled out. In the case of an internal combustion engine 1 without a recirculating air line 11 and without a recirculating air valve 12, the method may be terminated at this point or started afresh. Otherwise, from step 411 or 414 the method proceeds with step 416.

In step 416 it is checked whether the internal combustion engine 1 is in the charging mode. This query is repeated until the response is positive.

It is further checked in step 417 whether the recirculating air valve 12 is open. This query is also repeated until the response is positive.

In step 418 the first pressure value P1 and the second pressure value P2 are calculated and the first reference pressure R1 and the second reference pressure R2 are acquired. Then, in step 419 it is checked whether the first reference pressure R1 deviates by less than a defined fifth limit value GW5 from the first pressure value P1 and whether at the same time the second reference pressure R2 deviates by less than a defined sixth limit value GW6 from the second pressure value P2.

In the event of a negative response to the query in step 419, in step 420 it is checked whether the first reference pressure R1 is greater than the sum of the first pressure value P1 and the fifth limit value GW5 and whether at the same time the second reference pressure R2 is less than the difference between the second pressure value P2 and the sixth limit value GW6. If this is the case, it is to be inferred that the air flow rate through the recirculating air line 11 and/or the recirculating air valve 12 that is calculated by means of the intake manifold model is too high, for which reason the intake manifold model in step 421 is corrected in the direction of a lower air flow rate through the recirculating air line 11 and/or the recirculating air valve 12. With reference to equation 2, this may be realized for example by corresponding weighting of the reduced flow cross section $A_{RSV}$ of the recirculating air valve 12 or of the flow function $\Psi$, for example by corresponding weighting by means of a weighting factor.

If the response to the query in step 420 is negative, in step 422 it is checked whether the first reference pressure R1 is less that the difference between the first pressure value P1 and the fifth limit value GW5 and whether at the same time the second reference pressure R2 is greater than the sum of the second pressure value P2 and the sixth limit value GW6. If this is the case, it is inferred that the air flow rate through the recirculating air line 11 that is calculated by means of the intake manifold model is too low, for which reason in step 423 the intake manifold model is corrected in the direction of a higher air flow rate through the recirculating air line. This occurs in an analogous manner to step 421 by corresponding adaptation of the parameters in equation 2 for calculating the air flow rate through the recirculating air line 11.

A positive response to the query in step 419 or a negative response to the query in step 422 leads to the conclusion that the data for calculating the air flow rate through the recirculating valve 12 and/or the recirculating air line 11 are correct. This is possible especially as previously the data for calculating the air flow rates through the throttle valve 6 and the compressor 7 have been assessed as correct. The method may be either terminated in step 424 or started afresh.

What is claimed is:

1. A method of controlling an internal combustion engine comprising:
    an intake tract,
    a controllable throttle valve for controlling the air flow rate in the intake tract,
    a compressor, which is disposed in the intake tract downstream of the throttle valve and by means of which the internal combustion engine may be operated selectively in a charging mode and a non-charging mode,
    a first pressure sensor, which is disposed in the intake tract) downstream of the throttle valve and upstream of the compressor,
    a second pressure sensor, which is disposed in the intake tract downstream of the compressor,
    the method comprising the steps of:
    calculating a first pressure value in the intake tract downstream of the throttle valve and upstream of the compressor and a second pressure value in the intake tract downstream of the compressor by means of an intake manifold model,
    acquiring a first reference pressure by means of the first pressure sensor and a second reference pressure by means of the second pressure sensor,
    determining whether the internal combustion engine is in the charging mode or in the non-charging mode,
    correcting the intake manifold model in the event of a deviation of the first pressure value from the first reference pressure and a deviation of the second pressure value from the second reference pressure as a function of the charging mode or non-charging mode.

2. The method according to claim 1, wherein in the event that the internal combustion engine is in the non-charging mode, at least one parameter of the intake manifold model, on which a calculation of the an flow rate at the throttle valve is based, is corrected.

3. The method according to claim 2, wherein in the event that
    the first reference pressure is greater than the first pressure value, and
    the second reference pressure is greater than the second pressure value,
    the at least one parameter is corrected in the direction of a higher calculated air flow rate at the throttle valve.

4. The method according to claim 2, wherein in the event that
    the first reference pressure is less than the first pressure value, and
    the second reference pressure is less than the second pressure value,
    the at least one parameter is corrected in the direction of a lower calculated air flow rate at the throttle valve.

5. The method according to claim 1, wherein in the event that the internal combustion engine is in the charging mode, at least one parameter of the intake manifold model, on which a calculation of a air flow rate through the compressor is based, is corrected.

6. The method according to claim 5, wherein in the event that
    the first reference pressure is greater than the first pressure value, and
    the second reference pressure is less than the second pressure value,
    the at least one parameter is corrected in the direction of a lower calculated air flow rate through the compressor.

7. The method according to claim 5, wherein in the event that
    the first reference pressure is less than the first pressure value, and
    the second reference pressure is greater than the second pressure value,
    the at least one parameter is corrected in the direction of a higher calculated air flow rate through the compressor.

8. The method according to claim 1, wherein
    the intake tract comprises a recirculating, which in relation to the compressor pneumatically connects the downstream portion of the intake tract to the upstream portion of the intake tract,
    disposed in the recirculating air line is a controllable recirculating air valve by means of which an air flow rate through the recirculating air line
    wherein the correction of the intake manifold model is implemented additionally as a function of the setting of the recirculating air valve.

9. The method according to claim 8, wherein in the event that the internal combustion engine is in the charging mode and the recirculating air valve is closed, at least one parameter of the intake manifold model, on which the calculation of the air flow rate through the compressor is based, is corrected.

10. The method according to claim 9, wherein in the event that
    the first reference pressure is greater than the first pressure value, and
    the second reference pressure is less than the second pressure value,
    the at least one parameter is corrected in the direction of a lower calculated air flow rate through the compressor.

11. The method according to claim 9, wherein in the event that
the first reference pressure is less than the first pressure value, and
the second reference pressure is greater than the second pressure value,
the at least one parameter is corrected in the direction of a higher calculated air flow rate through the compressor.

12. The method according to claim 8, wherein in the event that the internal combustion engine is in the charging mode and the recirculating air valve is open, at least one parameter of the intake manifold model, on which the calculation of the air flow rate through the recirculating air line is based, is corrected.

13. The method according to claim 12, wherein in the event that
the first reference pressure is greater than the first pressure value, and
the second reference pressure is less than the second pressure value,
the at least one parameter is corrected in the direction of a lower calculated air flow rate through the recirculating air line.

14. The method according to claim 12, wherein in the event that
the first reference pressure is less than the first pressure value, and
the second reference pressure is greater than the second pressure value,
the at least one parameter is corrected in the direction of a higher calculated air flow rate through the recirculating air line.

15. The method according to claim 1, wherein
disposed in the intake tract is a recirculating air line which in relation to the compressor; pneumatically connects the downstream portion of the intake tract to the upstream portion of the intake tract,
disposed in the recirculating air line is a controllable recirculating air valve, by means of which the air flow rate through the recirculating air line is adjustable,
and according to the method
when the internal combustion engine, is operated in the non-charging mode,
in the event of a deviation of the first pressure value from the first reference pressure and a deviation of the second pressure value from the second reference pressure at least one parameter of the intake manifold model, on which the calculation of the air flow rate at the throttle valve is based, is corrected,
when the internal combustion engine is operated in the charging mode with the recirculating air valve closed,
the first pressure value and the second pressure value are calculated and the first reference pressure and the second reference pressure are acquired,
in the event of a deviation of the first pressure value from the first reference pressure and a deviation of the second pressure value from the second reference pressure, at least one parameter of the intake manifold model, on which the calculation of the air flow rate through the compressor is based, is corrected,
when the internal combustion engine is operated in the charging mode with the recirculating air valve open,
the first pressure value and the second pressure value are calculated and the first reference pressure and the second reference pressure are acquired,
in the event of a deviation of the first pressure value from the first reference pressure and a deviation of the second pressure value from the second reference pressure, at least one parameter of the intake manifold model, on which the calculation of the air flow rate through the recirculating air valve is based, is corrected.

16. An internal combustion engine comprising
an intake tract,
a controllable throttle valve for controlling the air flow rate in the intake tract,
a compressor, which is disposed in the intake tract downstream of the throttle valve and by means of which the internal combustion engine may be operated selectively in a charging mode and a non-charging mode,
a first pressure sensor which is disposed in the intake tract downstream of the throttle valve and upstream of the compressor,
a second pressure sensor, which is disposed in the intake tract downstream of the compressor,
a control device, in which an intake manifold model for calculating operating variables of the internal combustion engine is implemented,
wherein the control device is operable to
calculate a first pressure value in the intake tract downstream of the throttle valve and upstream of the compressor and a second pressure value in the intake tract downstream of the compressor are calculated by means of an intake manifold model,
acquire a first reference pressure by means of the first pressure sensor and a second reference pressure by means of the second pressure sensor,
determined whether the internal combustion engine is in the charging mode or in the non-charging mode, and to
correct the intake manifold model, in the event of a deviation of the first pressure value from the first reference pressure and a deviation of the second pressure value from the second reference pressure, as a function of the charging mode or non-charging mode.

17. The internal combustion engine according to claim 16, wherein the control device is further operable in the event that the internal combustion engine is in the non-charging mode, to correct at least one parameter of the intake manifold model, on which a calculation of an air flow rate at the throttle valve is based.

18. The internal combustion engine according to claim 17, wherein in the event that
the first reference pressure is greater than the first pressure value, and
the second reference pressure is greater than the second pressure value,
the control device is operable to correct at least one parameter in the direction of a higher calculated air flow rate at the throttle valve.

19. The internal combustion engine according to claim 17, wherein in the event that
the first reference pressure is less than the first pressure value, and
the second reference pressure is less than the second pressure value,
the control device is further operable to correct at least one parameter in the direction of a lower calculated air flow rate at the throttle valve.

20. The internal combustion engine according to claim 16, wherein in the event that the internal combustion engine is in the charging mode, the control device is further operable to correct at least one parameter of the intake manifold model, on which the calculation of the air flow rate through the compressor is based.

* * * * *

UNITED STATES PATENT AND TRADEMARK OFFICE
CERTIFICATE OF CORRECTION

PATENT NO. : 8,370,047 B2  
APPLICATION NO. : 12/600288  
DATED : February 5, 2013  
INVENTOR(S) : Thomas Burkhardt et al.

Page 1 of 1

It is certified that error appears in the above-identified patent and that said Letters Patent is hereby corrected as shown below:

In the Claims:

Column 14,
Lines 1-5, Claim 2. "The method according to claim 1, wherein in the event that the internal combustion engine is in the non-charging mode, at least one parameter of the intake manifold model, on which a calculation of the an flow rate at the throttle valve is based, is corrected." should read --The method according to claim 1, wherein in the event that the internal combustion engine is in the non-charging mode, at least one parameter of the intake manifold model, on which a calculation of an air flow rate at the throttle valve is based, is corrected.--.

Column 14,
Lines 23-27, Claim 5. "The method according to claim 1, wherein in the event that the internal combustion engine is in the charging mode, at least one parameter of the intake manifold model, on which a calculation of a air flow rate through the compressor is based, is corrected." should read --The method according to claim 1, wherein in the event that the internal combustion engine is in the charging mode, at least one parameter of the intake manifold model, on which a calculation of an air flow rate through the compressor is based, is corrected.--.

Signed and Sealed this
Twenty-second Day of April, 2014

Michelle K. Lee
*Deputy Director of the United States Patent and Trademark Office*